United States Patent Office 3,758,403
Patented Sept. 11, 1973

3,758,403
CATALYTIC CRACKING OF HYDROCARBONS WITH MIXTURE OF ZSM-5 AND OTHER ZEOLITES
Edward J. Rosinski, Deptford, and Charles J. Plank, Woodbury, N.J., and Albert B. Schwartz, Philadelphia, Pa., assignors to Mobil Oil Company
No Drawing. Filed Oct. 6, 1970, Ser. No. 78,573
Int. Cl. C10g 13/02
U.S. Cl. 208—120          12 Claims

ABSTRACT OF THE DISCLOSURE

Hydrocarbons are cracked to products boiling in the motor fuel range by using a catalyst mixture comprising a large pore size zeolite such as zeolite Y and a smaller pore size zeolite of the ZSM-5 type. In a preferred embodiment, a siliceous matrix material is also used. The use of the ZSM-5 type zeolite results in obtaining a fuel having an increased octane number and in increased yields of $C_3$ and $C_4$ olefins. These olefins can be utilized in making additional gasoline or they can be used to prepare chemicals in accordance with conventional technology.

BACKGROUND OF THE INVENTION

(1) Field of the invention

This invention relates to a novel catalytic cracking process to produce motor fuels involving the use of a catalyst mixture comprising two crystalline aluminosilicate zeolites—one zeolite can be stated to have general activity for cracking of the several types of hydrocarbons found in commercial gas oil whereas the ZSM-5 type zeolite, exercises a selective cracking function on only certain portions of the feed.

(2) Description of the prior art

Hydrocarbon conversion processes utilizing crystalline zeolites and, in particular, crystalline aluminosilicate catalysts have been the subject of expensive investigation during recent years as is obvious from both the patent and scientific literature. Crystalline aluminosilicates have been found to be particularly effective for a wide variety of hydrocarbon conversion processes including the catalytic cracking of a gas oil to produce motor fuels and have been described and claimed in many patents, including U.S. Pats. 3,140,249; 3,140,251; 3,140,252; 3,140,253; and 3,271,418. It is also known in the prior art to incorporate the crystalline aluminosilicate zeolite into a matrix for catalytic cracking and such disclosure appears in one or more of the above-identified U.S. patents.

It is also known that improved results will be obtained with regard to the catalytic cracking of gas oils if an aluminosilicate having a pore size of about 5 angstrom units is included with the large pore size aluminosilicate either with or without a matrix. A disclosure of this type is found in copending application Ser. No. 548,376, filed May 9, 1966.

Although the incorporation of a crystalline aluminosilicate having a pore size of about 5 angstrom units into a catalyst composite comprising a large pore size aluminosilicate has indeed been very effective with respect to the raising of octane number, nevertheless, it did so at the expense of the overall yield of gasoline. As can well be appreciated with regard to the present emphasis on environmental control and, in particular, air pollution, it is extremely desirable to obtain a process which will provide higher octane number gasolines so as to minimize the amount of lead which is usually added if it is desired to raise the octane number of the gasoline to a still higher level.

DESCRIPTION OF THE INVENTION

It has now been discovered that improved results can be obtained in the catalytic cracking of gas oil with respect to both octane number and overall yield if the gas oil is cracked utilizing a catalyst composition comprising a large pore size crystalline aluminosilicate in admixture with a novel shape selective crystalline aluminosilicate generally identified as the ZSM-5 type.

Before the discovery of the ZSM-5 type zeolites all the crystalline aluminosilicates heretofore employed in prior art conversion processes fell into one of two general types. They either had pore sizes of about 5 angstrom units or had pore sizes of from about 6 to about 15 angstrom units. The 5 angstrom unit aluminosilicates were generally stated to be shape selective in that they allowed selective conversion of normal aliphatic compounds from a mixture of the same of iso-aliphatic compounds and cyclic compounds. The second type of aluminosilicate, i.e, those generally stated as having a pore size of 6 to 15 angstrom units will admit both normal and iso-aliphatic compounds. Thus, a very convenient method of identifying a good shape selective catalyst was to show that it would selectively sorb hexane from a mixture of the same with 2-methyl pentane since the former compound was able to enter its internal pore structure whereas the latter iso-compound was unable to do so.

The ZSM-5 type zeolites which are used in combination with the large pore zeolites in the novel cracking process of this invention can generally be stated to be intermediate between the two types of aluminosilicates previously described. Thus, the ZSM-5 type catalysts used in the novel process of this invention will allow the entry into their internal pore structure of normal aliphatic compounds and slightly branched aliphatic compounds, particularly monomethyl substituted compounds, yet substantially exclude all compounds containing at least a quaternary carbon atom or having a molecular dimension equal to or substantially greater than a quaternary carbon atom. Additionally, aromatic compounds having side chains similar to the normal aliphatic compounds and slightly branched aliphatic compounds above described could have said side chains enter the internal pore structure of the instant catalysts. Thus, if one were to measure the selectivity of the ZSM-5 type materials employed in the process of this invention by the heretofore mentioned prior art test, i.e., the ability to selectively sorb hexane from a mixture of the same with isohexane, these catalysts would have to be stated as being non-shape selective. It should be immediately apparent, however, that the term selectivity has a far greater significance than merely the ability to preferentially distinguish between normal paraffins and isoparaffins. Selectivity on shape is theoretically possible at any shape or size although, quite obviously, such selectivity might not result in an advantageous catalyst for any and all hydrocarbon conversion processes.

While not wishing to be bound by any theory of operation nevertheless, it appears that the crystalline zeolitic materials of the ZSM-5 type employed in the instant invention cannot simply be characterized by the recitation of a pore size or a range of pore sizes. It would appear that the uniform pore openings of this new type of zeolite are not approximately circular in nature, as is usually the case in the heretofore employed zeolites, but rather, are approximately elliptical in nature. Thus, the pore openings of the instant zeolitic materials have both a major and a minor axes, and it is for this reason that the unusual and novel molecular sieving effects are achieved. This elliptical shape can be referred to as a "keyhole." It would appear that the minor axis of the elliptical pores in the zeolites apparently have an effective size of about 5.5 angstrom units. The major axis appears to be somewhere between 6 and about 9 angstrom units. The unique keyhole molecular sieving action of these materials is presumably due to the presence of these approximately elliptically shaped windows controlling access to the internal crystalline pore structure.

A test method has been devised in order to determine whether or not a zeolite possess the unique molecular sieving properties necessary to be combined with a large pore zeolite in order to carry out the novel conversion process of this invention. In said test method a candidate zeolite free from any matrix or binder is initially converted to the so-called acid or hydrogen form. This procedure involves exhaustive exchange with an ammonium chloride solution in order to replace substantially all metallic cations originally present. The sample is then dried, sized to 20–30 mesh and calcined in air for 16 hours at 550° C. One gram of the so-treated zeolite is then contaced with benzene at a pressure of twelve torr at a temperature of 25° C. for a time period of two hours. Another gram sample is contacted with mesitylene at a pressure of 0.5 torr at a temperature of 25° C. for a period of six hours. A preferred zeolite is one whose acid form will adsorb at least 3.0 weight percent benzene and less than 1.5 weight percent mesitylene at the above-recited conditions.

Examples of zeolitic materials which are operable in the process of this invention are ZSM-5 type which family includes not only ZSM-5 but also ZSM-8 zeolites. ZSM-5 type materials are disclosed and claimed in copending application Ser. No. 865,472, filed Oct. 10, 1969, and ZSM-8 is disclosed and claimed in copending application Ser. No. 865,418 filed Oct. 10, 1969.

The family of ZSM-5 compositions has the characteristic X-ray diffraction pattern set forth in Table 1, hereinbelow. ZSM-5 compositions can also be identified, in terms of mole ratios of oxides, as follows:

$$0.9 \pm 0.2\ M_{2/n}O : W_2O_3 : 5\text{--}100\ YO_2 : zH_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2\ M_{2/n}O : Al_2O_3 : 5\text{--}100\ SiO_2 : zH_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the following significant lines:

TABLE 1

| Interplanar spacing $d$ (A) | Relative intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 $I/I_0$, were $I_0$ is the intensity of the strongest line or peak, and $d$ (obs.), the interplanar spacing in A, corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-ray diffraction ZSM-5 powder in cation exchanged forms $d$ spacings observed

| As made | HCl | NaCl | CaCl$_2$ | RECl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
|  |  | 9.01 | 9.02 |  | 8.99 |
| 8.06 |  |  |  |  |  |
| 7.44 | 7.46 | 7.46 | 7.46 | 7.40 | 4.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
|  | 3.60 | 3.60 | 3.60 | 3.61 | 3.60 |
| 3.40 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 |  |  | 3.17 | 3.18 |  |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
|  |  |  |  | 2.97 |  |
|  | 2.95 | 2.95 | 2.94 | 2.95 | 2.95 |
| 2.86 | 2.87 | 2.87 | 2.87 | 2.87 | 2.87 |
| 2.80 |  |  |  |  |  |
| 2.78 |  |  | 2.78 |  | 2.78 |
| 2.73 | 2.74 | 2.74 | 2.73 | 2.74 | 2.74 |
| 2.67 |  |  | 2.68 |  |  |
| 2.66 |  |  | 2.65 |  |  |
| 2.60 | 2.61 | 2.61 | 2.61 | 2.61 | 2.61 |
|  | 2.59 |  | 2.59 |  |  |
| 2.57 |  | 2.57 | 2.56 |  | 2.57 |
| 2.50 | 2.52 | 2.52 | 2.52 | 2.52 |  |
| 2.49 | 2.49 | 2.49 | 2.49 | 2.49 | 2.49 |
|  |  |  | 2.45 |  |  |
| 2.41 | 2.42 | 2.42 | 2.42 | 2.42 |  |
| 2.39 | 2.40 | 2.40 | 2.39 | 2.40 | 2.40 |
|  |  |  | 2.38 | 2.35 | 2.38 |
|  | 2.33 |  | 2.33 | 2.32 | 2.33 |
|  | 2.30 |  |  |  |  |
|  | 2.24 | 2.23 | 2.23 |  |  |
|  | 2.20 | 2.21 | 2.20 | 2.20 |  |
|  | 2.18 | 2.18 |  |  |  |
|  |  | 2.17 | 2.17 |  |  |
|  | 2.13 |  | 2.13 |  |  |
|  | 2.11 | 2.11 |  | 2.11 |  |
|  |  |  | 2.10 | 2.10 |  |
|  | 2.08 | 2.08 |  | 2.08 | 2.08 |
|  |  | 2.07 | 2.07 |  |  |
|  |  |  | 2.04 |  |  |

TABLE 2—Continued

| As made | HCl | NaCl | CaCl₂ | RECl₃ | AgNO₃ |
|---|---|---|---|---|---|
| 2.01 | 2.01 | 2.01 | 2.01 | 2.01 | 2.01 |
| 1.99 | 2.00 | 1.99 | 1.99 | 1.99 | 1.99 |
|  |  |  | 1.97 | 1.96 |  |
| 1.95 | 1.95 | 1.95 | 1.95 | 1.95 |  |
|  |  |  |  | 1.94 |  |
|  | 1.92 | 1.92 | 1.92 | 1.92 | 1.92 |
| 1.91 |  |  |  | 1.91 |  |
|  |  |  |  | 1.88 |  |
| 1.87 | 1.87 | 1.87 | 1.87 | 1.87 | 1.87 |
|  | 1.86 |  |  |  |  |
| 1.84 | 1.84 |  |  | 1.84 | 1.84 |
| 1.83 | 1.83 | 1.83 | 1.83 | 1.83 |  |
| 1.82 |  | 1.81 |  | 1.82 |  |
| 1.77 | 1.77 | 1.79 | 1.78 |  | 1.77 |
| 1.76 | 1.76 | 1.76 | 1.76 | 1.76 | 1.76 |
|  |  | 1.75 |  |  | 1.75 |
|  | 1.74 | 1.74 | 1.73 |  |  |
| 1.71 | 1.72 | 1.72 | 1.71 |  | 1.70 |
| 1.67 | 1.67 | 1.67 |  | 1.67 | 1.67 |
| 1.66 | 1.66 |  | 1.66 | 1.66 | 1.66 |
|  |  | 1.65 | 1.65 |  |  |
|  |  | 1.64 | 1.64 |  |  |
|  | 1.63 | 1.63 | 1.63 | 1.63 | 1.62 |
|  | 1.61 | 1.61 | 1.61 |  | 1.61 |
| 1.58 |  |  |  |  |  |
|  | 1.57 | 1.57 |  | 1.57 | 1.57 |
|  |  | 1.56 | 1.56 | 1.56 |  |

Zeolite ZSM-5 can be suitably prepared by preparing a solution containing tetrapropyl ammonium hydroxide, sodium oxide, an oxide of aluminum or gallium, an oxide of silica and water and having a composition, in terms of mole ratios of oxides, falling within the following ranges:

TABLE 3

|  | Broad | Preferred | Particularly preferred |
|---|---|---|---|
| OH⁻/SiO₂ | 0.07–1.0 | 0.1–0.8 | 0.2–0.75 |
| R₄N⁺/(R₄N⁺ +Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon maintaining the mixture until crystals of the zeolite are formed. Thereafter the crystals are separated from the liquid and recovered. Typical reaction conditions consist of heating the foregoing reaction mixture to a temperature of from about 75° C. to 175° C. for a period of time of from about six hours to 60 days. A more preferred temperature range is from about 90 to 150° C. with the amount of time at a temperature in such range being from about 12 hours to 20 days.

The disgestion of the gel particles is carried out until crystals form. The solid product is separated from the reaction medium, as by cooling the whole to room temperature, filtering, and water washing.

ZSM-5 is preferably formed as an aluminosilicate. The composition can be prepared utilizing materials which supply the appropriate oxide. Such compositions include for an alumino-silicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

$$0.9 \pm 0.2\ M_{2/n}O:Al_2O_3:5-100\ SiO_2:z\ H_2O$$

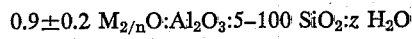

wherein M is at least one action, n is the valence thereof and z is from 0 to 40. In a preferred synthesized form, the zeolite has a formula, in terms of mole ratios of oxides, as follows:

$$0.9 \pm 0.2\ M_{2/n}O:Al_2O_3:10-60\ SiO_2:z\ H_2O$$

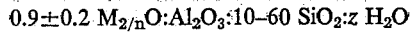

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| dA | I/I₀ | dA | I/I₀ | dA | I/I₀ | dA | I/I₀ |
|---|---|---|---|---|---|---|---|
| 11.1 | 46 | 4.35 | 7 | 3.04 | 10 | 2.32 | 1 |
| 10.0 | 42 | 4.25 | 18 | 2.99 | 6 | 2.28 | 1 |
| 9.7 | 10 | 4.07 | 20 | 2.97 | 4 | 2.23 | 1 |
| 9.0 | 6 | 4.00 | 10 | 2.94 | 3 | 2.20 | 1 |
| 7.42 | 10 | 3.85 | 100 | 2.86 | 2 | 2.17 | 1 |
| 7.06 | 7 | 3.82 | 57 | 2.78 | 1 | 2.12 | 1 |
| 6.69 | 5 | 3.75 | 25 | 2.73 | 4 | 2.11 | 1 |
| 6.35 | 12 | 3.71 | 30 | 2.68 | 1 | 2.08 | 1 |
| 6.04 | 6 | 3.64 | 26 | 2.61 | 3 | 2.06 | 1 |
| 5.97 | 12 | 3.59 | 2 | 2.57 | 1 | 2.01 | 6 |
| 5.69 | 9 | 3.47 | 6 | 2.55 | 1 | 1.99 | 6 |
| 5.56 | 13 | 3.43 | 9 | 2.51 | 1 | 1.95 | 2 |
| 5.36 | 3 | 3.39 | 5 | 2.49 | 6 | 1.91 | 2 |
| 5.12 | 4 | 3.34 | 18 | 2.45 | 1 | 1.87 | 3 |
| 5.01 | 7 | 3.31 | 8 | 2.47 | 2 | 1.84 | 1 |
| 4.60 | 7 | 3.24 | 4 | 2.39 | 3 | 1.82 | 2 |
| 4.45 | 3 | 3.13 | 3 | 2.35 | 1 |  |  |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range:

SiO₂/Al₂O₃—from about 10 to about 200
Na₂O/tetraethylammonium hydroxide—from about 0.05 to 0.20
Tetraethylammonium hydroxide/SiO₂—from about 0.08 to 1.0
H₂O/tetraethylammonium hydroxide—from about 80 to about 200

Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The foregoing product is dried, e.g. at 230° F., for from about 8 to 24 hours. Of course, milder conditions may be employed if desired, e.g., room temperature under vacuum.

As has heretofore been stated, a zeolite of the ZSM-5 type above-described is used in conjunction with a large pore zeolite, i.e. one having a pore size greater than 7 angstrom units which has the ability to act upon substantially all the components usually found in a commercial gas oil. Large pore aluminosilicates of this type are well known and include natural and synthetic faujasite of both the X and Y type, as well as zeolite L. Of these materials, zeolite Y is particularly preferred.

Both the large pore zeolites and the ZSM-5 type zeolites used in the instant invention usually have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of rare earth, $Mg^{++}$, $Zn^{++}$, $Mn^{++}$, $Al^{+++}$, and $CA^+$.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. 3,140,249; 3,140,251; and 3,140,253.

Following contact with the salt solution of the desired replacing cation, the zeolites may be washed with water and dried at a temperature ranging from 150° F. to about 600° F. and thereafter heated in air or other inert gas at temperatures ranging from about 500° F. to 1500° F. for periods of time ranging from 1 to 48 hours or more. It has been further found in accordance with the invention that catalysts of improved selectivity and having other beneficial properties in catalytic cracking are obtained by subjecting the zeolite to treatment with steam at elevated temperatures ranging from 800° F. to 1600° F. and preferably 1000° F. and 1500° F. The treatment may be accomplished in atmospheres consisting partially or entirely of steam. This treatment may be accomplished within a commercial cracking unit, e.g. by gradual addition of the unsteamed catalyst to the unit.

A similar treatment can be accomplished at lower temperatures and elevated pressures, e.g. 350–700° F. at 10 to about 200 atmospheres.

As has heretofore been pointed out in one embodiment, the novel catalyst composites of this invention comprise a physical mixture of at least two different cracking components, one being an aluminosilicate having a pore size greater than about 7 angstrom units. In one embodiment, a mixture of catalyst particles is used in which each particle contains only one of the two types of zeolites. Thus, for example, a mixture of spray dried particles comprising ZSM–5 type crystals in a matrix and particles comprising faujasite crystals in a matrix may be added as make-up to the cracking unit. Alternatively, the catalyst components may be pelleted, cast, molded, spray-dried or otherwise formed into pieces of desired size and shape such as rods, spheres, pellets, etc.

A most preferred embodiment of this invention resides in the use of a porous matrix together with the two types of zeolites previously described. Therefore, the most preferred class of catalysts falling within the scope of this invention would include a system containing an aluminosilicate of the ZSM–5 type and an aluminosilicate having a pore size greater than 7 angstrom units which are combined, dispersed or otherwise intimately admixed with a porous matrix in such proportions that the resulting product contains from 1% to 95% by weight, and preferably from 10 to 50% by weight, of the total aluminosilicates in the final composite. It is to be understood that both aluminosilicates need not be mixed with the same matrix, but that separate matrices may be employed.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, and inorganic oxides. Inorganic compositions especially those of a siliceous nature are preferred. Of these matrices, inorganic oxides such as clay, chemically treated clay, silica, silica-alumina, etc., are particularly preferred because of their superior porosity, attrition resistance, and stability under reaction conditions, especially those reaction conditions encountered in the cracking of gas oil.

The compositing of the aluminosilicate with an inorganic oxide can be achieved by several methods wherein the aluminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in a ball mill or other types of mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc. to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide, or in the dried state.

The catalytically inorganic oxide matrix may also consist of a plural gel comprising a predominant amount of silica with one or more metals or oxides thereof selected from Groups I–B, II, III, IV, V, VI, VII, and VIII of the Periodic Table. Particular preference is given to plural gels or silica with metal oxides of Groups II–A, III and IV–A of the Periodic Table, especially wherein the metal oxide is rare earth oxide, magnesia, alumina, zirconia, titania, beryllia, thoria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The inorganic oxide may also consist of raw clay or a clay mineral which has been treated with an acid medium to render it active. The aluminosilicate can be incorporated into the clay simply by blending the two and fashioning the mixture into desired shapes. Suitable clays include attapulgite, kaolin, sepiolite, polygarskite, kaolinite, halloysite, plastic ball clays, bentonite, montmorillonite, illite, chlorite, etc.

Other useful matrices include powders of refractory oxides, such as α-alumina, etc., having very low internal pore volume. Preferably, these materials have substantially no inherent catalytic activity of their own.

The catalyst product can be heated in steam or in other atmospheres, e.g. air, near the temperature contemplated for conversion but may be heated to operating temperatures initially during use in the conversion process. Gen erally, the catalyst is dried between 150° F. and 600° F. and thereafter may be calcined in air, steam, nitrogen, helium, flue gas or other gases not harmful to the catalyst product at temperatures ranging from about 500° F. to 1600° F. for periods of time ranging from 1 to 48 hours or more. It is to be understood that the aluminosilicate can also be calcined prior to incorporation into the inorganic oxide gel. It is also to be understood that the aluminosilicate or aluminosilicates need not be ion exchanged prior to incorporation in a matrix but can be so treated during or after incorporation into the matrix.

It has been further found in accordance with the invention that catalysts of improved selectivity and having other beneficial properties in gas oil cracking are obtained by subjecting the catalyst product to a mild steam treatment carried out at elevated temperatures of 800° F. to 1600° F. and preferably at temperatures of about 1000° F. to 1500° F. The treatment may be accomplished in an atmosphere of 100% steam or in an atmosphere consisting of steam and air or a gas which is not harmful to the aluminosilicate. The steam treatment apparently provides beneficial properties in the aluminosilicate compositions and can be conducted before, after or in place of the calcination treatment.

The particle size of each type of zeolite making up the catalyst system is not narrowly critical but should be less than 100 microns and particle sizes within the range of from less than 0.1 to 10 microns are preferred. It is also to be noted that each individual component in the catalyst system need not be of the same particle size.

The particular proportion of one component to the other in the catalyst system is also not narrowly critical and can vary over an extremely wide range. However, it has been found that for most purposes the weight ratio of the ZSM-5 type aluminosilicate to the large pore size aluminosilicate can range from 1:10 up to 3:1 and preferably from 1:3 up to 2:1 and still more preferably 1:2 to 1:1.

The ZSM-5 type crystalline aluminosilicates and the crystalline aluminosilicates with pores greater than 7 angstroms may be added to a cracking unit as a mixture of crystallites within the same particles of catalyst composite, whether the particles are beads, extrudates, or spray-dried microspheres. Alternately, a mixture of particles may be added to the cracking unit, some particles containing only the ZSM-5 type aluminosilicate crystallites and the other particles containing only the large pore aluminosilicate crystallites. In either case, the ratio of ZSM-5 type aluminosilicates to large pore aluminosilicates should be within the range of 1:10 to 3:1. The ratio of aluminosilicates within the range is controlled to produce the most desirable balance of high octane gasoline and $C_3$ and $C_4$ olefin yields.

Within the above description of the aluminosilicates which can be physically admixed in a porous matrix to prepare the catalysts of this invention, it has been found that certain aluminosilicates provide superior results when employed in catalytic cracking operations.

First of all, it is preferred that there be a limited amount of alkali metal cations associated with the aluminosilicates since the presence of alkali metals tends to suppress or limit catalytic properties, the activity of which as a general rule decreases with increasing content of alkali metal cations. Therefore, it is preferred that the aluminosilicates contain no more than 0.25 equivalent per gram atom of aluminum and more preferably no more than 0.15 equivalent per gram atom of aluminum of alkali metal cations.

With regard to the metal cations associated with the large pore aluminosilicate, the general order of preference is first cations of trivalent metals, followed by cations of divalent metals, with the least preferred being cations of monovalent metals. Of the trivalent metal cations, the most preferred are rare earth metal cations, either individually or as a mixture of rare earth metal cations.

Additionally, it is particularly preferred to have at least some protons or proton precursors associated with the aluminosilicate.

It is also preferred that both of the aluminosilicates have an atomic ratio of silicon to aluminum of at least 1.25 preferably 1.8 and even more desirable at least 2.0.

It is to be understood, however, that this invention includes the use of catalyst compositions wherein both aluminosilicates are of the same class, e.g. both metal aluminosilicates; of different classes, e.g. one metal and one acid aluminosilicate; in the same matrix or in different matrices, i.e. one aluminosilicate in silica-alumina and the other in silica-zirconia.

Cracking operations carried out with the catalysts prepared in accordance with the invention may be effected at temperatures ranging from about 400° F. to 1300° F. under reduced atmospheric or superatmospheric pressure. The catalyst can be utilized in the form of spheroidal particles or extrudates or beads disposed in a stationary bead or in a continuous process wherein the catalyst is disposed in a reaction zone to which catalyst is continuously added and from which catalyst is continuously removed. Particularly effective cracking processes can be achieved when the catalyst is used to obtain the inherent advantages realized in moving bed techniques such as the Thermofor Catalytic Cracking Process as well as in fluidized cracking processes.

Hydrocarbon charge stocks undergoing cracking in accordance with this invention comprise hydrocarbons generally and, in particular, petroleum fractions having an initial boiling point of at least 400° F., a 50% point of at least 500° F., and an end point of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The process of this invention may be carried out in equipment suitable for catalytic operations. The process may be operated batchwise. It is preferable, however, and generally more feasible, to operate continuously. Accordingly, the process is adapted to operations using a fixed bed of catalyst. Also the process can be operated using a moving bed of catalyst wherein the hydrocarbon flow may be concurrent or countercurrent to the catalyst flow. A fluid type of operation may also be employed with the catalyst described herein. After cracking the resulting products may suitably be separated from the remaining components by conventional means such as adsorption, distillation, etc. Also the catalyst, after use over an extended period of time, may be regenerated with hydrogen or in accordance with conventional procedures, by burning off carbonaceous deposits from the surface of the catalyst in an oxygen containing atmosphere under the conditions of elevated temperature.

Although the process of the invention has been described as having both the cracking catalyst of generalized competence and the ZSM-5 type aluminosilicate in the same reaction zone, another embodiment of this invention resides in carrying out two separate cracking operations, one with one component of the catalyst composition and one with the other component. Thus, the invention will include cracking a feed stream with a cracking catalyst of generalized competence and then recracking the reaction products obtained with an aluminosilicate of the ZSM-5 type.

The high catalytic activity and selectivity of the catalyst system is illustrated by its ability to catalyze the conversion of gas oils. Except where otherwise noted, the gas oil used with a mid-continent gas oil having a boiling range of about 450–950° F. to gasoline having an end point of 410° F. Test conditions are indicated in the various tables of data.

The following examples will illustrate the best mode now contemplated for carrying out the invention.

EXAMPLE 1

This example will illustrate the catalytic cracking of a gas oil with a catalyst composition comprising a large pore size aluminosilicate in a clay matrix. There is *no* ZSM–5 type catalyst added in this example. Thus, it is not a catalyst representative of the present invention, but a comparison catalyst.

A catalyst composition comprising 90 parts by weight of Georgia clay and 10 parts by weight of a rare earth exchanged crystalline aluminosilicate identified as zeolite Y (REY) were blended together and extruded through 3/16 of an inch diameter opening. The catalyst composition was then treated for 24 hours at 1200° F. with 15 p.s.i.g. steam. The resulting composition contained 0.38 weight percent sodium and contained 1.60 weight percent rare earth determined as rare earth oxides.

The catalyst was evaluated for the catalytic cracking of gas oil at 900° F. and the results are shown in the following table.

| | |
|---|---|
| LHSV | 4 |
| C/O | 1.5 |
| Temperature, ° F. | 906 |
| Conversion, vol. percent | 75.2 |
| $C_5^+$ gasoline, vol. percent | 63.7 |
| Total $C_4$, vol. percent | 17.2 |
| Dry gas, wt. percent | 6.4 |
| Coke, wt. percent | 1.7 |
| Hydrogen, wt. percent | 0.05 |
| ON (R+3), $C_5^+$ gasoline | 93.7 |

| | Weight | Volume |
|---|---|---|
| $C_3^=$ | 3.4 | 5.8 |
| $C_4^=$ | 4.8 | 6.9 |
| $iC_4$'s | 5.2 | 8.1 |
| $C_3^=+C_4^=$alkylate | | 21.8 |
| Outside $iC_4$'s | | 6.7 |
| Total yield $C_5^{++}$ alkylate | | 85.5 |
| ON (R+3) $C_5^{++}$ alkylate | 96.4 | |

In all the examples, calculations regarding the quantity of alkylate which can be made from the olefins produced in the cracking process were made as follows. Isobutane is the material reacted with the olefin. The total volume of isobutane needed for alkylation (outside iso-$C_4^+$ isobutane produced by cracking) is simply calculated from the stochiometry of the reaction and the density of isobutane. The volume of alkylate which can be made from butylenes ($C_4^=$)=vol. $C_4^=$(1.85) (0.95) and the volume of alkylate which can be made from propylene ($C_3^=$)= vol. $C_3^=$(1.75) (0.95). Here the first multiplier is the volume expansion due to alkylation and the second is the efficiency of the alkylation process.

The octane number calculations on total gasoline including alkylate are made using the blending value of 104 octane number (R+3 cc. TEL) for $C_3$–$C_4$ alkylate in the leaded gasoline. For clear research octane numbers the blending values used are 90.5 octane number for $C_3$ alkylate and 95.0 octane number for $C_4$ alkylate.

EXAMPLE 2

The procedure of Example 1 was employed except that 5 parts by weight of ZSM–5 which had been ion exchanged with ammonium ions and then calcined were incorporated into the mixture of rare earth Y and Georgia clay. Thus, the catalyst composite comprised 85 parts by weight of Georgia clay, 10 parts by weight of rare earth Y and 5 parts by weight of the hydrogen form of ZSM–5. This catalyst mixture was analyzed and found to contain 0.34 weight percent sodium and 1.6 weight percent rare earth determined as rear earth oxides.

Evaluation of this catalyst for the cracking of gas oil gave the following results:

| | |
|---|---|
| LHSV | 4 |
| C/O | 1.5 |
| Temperature, ° F. | 903 |
| Conversion, vol. percent | 72.8 |
| $C_5^+$ gasoline, vol. percent | 55.3 |
| Total $C_4$, vol. percent | 19.2 |
| Dry gas, wt. percent | 10.0 |
| Coke, wt. percent | 1.7 |
| Hydrogen, wt. percent | 0.04 |
| ON (R+3), C gasoline | 97.3 |

| | | |
|---|---|---|
| $C_3^=$ | 6.64 | 11.42 |
| $C_4^=$ | 5.8 | 8.4 |
| $iC_4$'s | 5.9 | 9.2 |
| $C_3$–$C_4$ alkylate | | 33.8 |
| Outside $iC_4$'s | | 14.4 |
| Total yield alkylate and $C_5^+$ gasoline | | 89.1 |
| ON (R+3) $C_5^+$ and alkylate | | 101.0 |

EXAMPLE 3

This example will illustrate the catalytic cracking of gas oil utilizing a catalyst composition of this invention.

The procedure of Example 2 was repeated with the exception that 10 parts by weight of the hydrogen form of ZSM–5 were employed instead of 5 parts as in Example 2. Thus, the catalyst mixture comprises 80 parts by weight of Georgia clay, 10 parts by weight of rare earth exchanged Y and 10 parts by weight of the hydrogen form of ZSM–5. The catalyst mixture was analyzed and found to contain 0.33 weight percent sodium and 1.20 weight percent rare earth determined as rare earth oxides.

The catalyst mixture was evaluated for the catalytic cracking of gas oil in the same manner as Example 1 with the following results:

| | |
|---|---|
| LHSV | 4 |
| C/O | 1.5 |
| Temperature, ° F. | 902 |
| Conversion, vol. percent | 69.7 |
| $C_5^+$ gasoline, vol. percent | 46.4 |
| Total $C_4$, vol. percent | 23.4 |
| Dry gas, wt. percent | 11.6 |
| Coke, wt. percent | 1.6 |
| Hydrogen, wt. percent | 0.04 |
| ON (R+3), $C_5^+$ gasoline | 98.6 |

| | Weight | Volume |
|---|---|---|
| $C_3^=$ | 7.9 | 13.6 |
| $C_4^=$ | 7.7 | 11.1 |
| $iC_4$'s | 6.7 | 10.4 |
| $C_3$–$C_4$ alkylate | | 42.2 |
| Outside $iC_4$'s | | 18.9 |
| Total yield alkylate+$C_5^+$ gasoline | | 88.6 |
| ON (R+3) $C_5^+$+alkylate | 101 | |

EXAMPLE 4

The procedure of Example 3 was repeated with the sole exception that 2½ parts by weight of the hydrogen form of ZSM–5 were employed instead of 10 parts by weight as in Example 3.

Evaluation of the catalyst composite for the catalytic cracking of gas oil gave the following results:

| | |
|---|---|
| LHSV | 4 |
| C/O | 1.5 |
| Temperature, ° F. | 900 |
| Conversion, vol. percent | 67.2 |
| $C_5^+$ gasoline, vol. percent | 53.4 |
| Total $C_4$, vol. percent | 17.6 |
| Dry gas, wt. percent | 7.5 |
| Coke, wt. percent | 1.8 |
| Hydrogen, wt. percent | 0.0 |
| ON (R+3), $C_5$ gasoline | 96.7 |

|  | Weight | Volume |
|---|---|---|
| $C_3^-$ | 4.55 | 7.85 |
| $C_4^-$ | 5.0 | 8.9 |
| $iC_4$'s | 5.7 | 8.9 |
| $C_3$–$C_4$ alkylate |  | 28.7 |
| Outside $iC_4$'s |  | 10.5 |
| Total yield alkylate and $C_5^+$ gasoline |  | 82.1 |
| ON (R+3) $C_5^+$ gasoline and alkylate | 99 |  |

EXAMPLE 5

The procedure of Example 4 was repeated with the exception that 1½ parts of the hydrogen form of ZSM-5 was employed instead of 2½ parts.

Evaluation of the catalyst composite for catalytic cracking gave the following results:

| LHSV | 4 |
|---|---|
| C/O | 1.5 |
| Temperature, °F. | 900 |
| Conversion, vol. percent | 72.2 |
| $C_5^+$ gasoline, vol. percent | 58.5 |
| Total $C_4$, vol. percent | 17.6 |
| Dry gas, wt. percent | 7.3 |
| Coke, wt. percent | 1.8 |
| Hydrogen, wt. percent | 0.4 |
| ON (R+3), $C_5^+$ gasoline | 95.5 |

|  | Weight | Volume |
|---|---|---|
| $C_3^-$ | 4.4 | 7.6 |
| $C_4^-$ | 4.9 | 7.1 |
| $iC_4$'s | 5.7 | 8.85 |
| $C_3$–$C_4$ alkylate |  | 25.1 |
| Outside $iC_4$'s |  | 8.3 |
| Total yield alkylate and $C_5^+$ gasoline |  | 83.6 |
| ON (R+3) $C_5^+$ gasoline and alkylate | 97.8 |  |

EXAMPLE 6

This example will illustrate the catalytic cracking of gas oil with a rare earth Y aluminosilicate in clay alone. The procedure of Example 1 was repeated with the exception that half as much rare earth Y was employed, i.e. the catalyst composition comprised 5 parts by weight of rare earth Y and 95 parts by weight of Georgia clay. Thus, it is not a catalyst representative of the present invention. Analysis showed that the catalyst composition contained 0.21 weight percent sodium and 0.87 weight percent rare earth determined as rare earth oxides.

Evaluation of the catalyst composition for the catalytic cracking of gas oils gave the following results:

| LHSV | 4 |
|---|---|
| C/O | 1.5 |
| Temperature, °F. | 907 |
| Conversion, vol. percent | 57.6 |
| $C_5^+$ gasoline, vol. percent | 52.0 |
| Total $C_4$, vol. percent | 10.8 |
| Dry gas, wt. percent | 4.7 |
| Coke, wt. percent | 1.0 |
| Hydrogen, wt. percent | 0.05 |
| ON (R+3), $C_5^+$ gasoline | 94.4 |

|  | Weight | Volume |
|---|---|---|
| $C_3^-$ | 2.7 | 4.7 |
| $C_4^-$ | 3.4 | 4.9 |
| $iC_4$'s | 3.1 | 4.8 |
| $C_3$–$C_4$ alkylate |  | 16.5 |
| Outside $iC_4$'s |  | 6.2 |
| Total yield alkylate and $C_5^+$ gasoline |  | 68.5 |
| ON (R+3) $C_5^+$ alkylate | 96.5 |  |

EXAMPLE 7

The procedure of Example 6 was repeated with the exception that 10 parts by weight of the hydrogen form of ZSM-5 was also employed. The catalyst composition consisted of 85 parts by weight of Georgia clay, 5 parts by weight of a rare earth Y and 10 parts by weight of the hydrogen form of ZSM-5. Analysis of the catalyst composition showed that it contained 0.19 weight percent sodium and 0.6 weight percent rare earth as rare earth oxides.

Evaluation of the above catalyst composite for the catalytic cracking of gas oil gave the following results.

| LHSV | 4 |
|---|---|
| C/O | 1.5 |
| Temperature, °F. | 896 |
| Conversion, vol. percent | 57.9 |
| $C_5^+$ gasoline, vol. percent | 41.3 |
| Total $C_4$, vol. percent | 18.0 |
| Dry gas, wt. percent | 9.2 |
| Coke, wt. percent | 1.0 |
| Hydrogen, wt. percent | 0.03 |
| ON (R+3), C | 98.7 |

|  | Weight | Volume |
|---|---|---|
| $C_3^-$ | 6.9 | 11.8 |
| $C_4^-$ | 6.9 | 9.9 |
| $iC_4$'s | 4.4 | 6.9 |
| $C_3$–$C_4$ alkylate |  | 37.2 |
| Outside $iC_4$'s |  | 18.8 |
| Total yield alkylate and $C_5^+$ gasoline |  | 78.5 |
| ON (R+3) $C_5^+$ gasoline and alkylate | 101.0 |  |

Analysis of the results of Examples 1–5 show that in all cases where ZSM-5 was added to the large pore size zeolite, improvement in octane number resulted.

It should be noted that an increase in octane number is gained at the expense of the overall direct yield of $C_5^+$ gasoline, and in this connection, the increase in octane numbers as between Example 1 (93.7) and Example 2 (97.3) was at the expense of total direct gasoline production, i.e. 63.7 volume percent for Example 1 as opposed to 55.3 volume percent of Example 2 at a slightly lower conversion. However, it is apparent from the data that the loss of gasoline product is balanced by higher yields of $C_4$'s and dry gas. Most of this increase shows up as higher yields of $C_3$ and $C_4$ olefins. These olefins can be alkylated to achieve higher total yields of product in the gasoline range having higher octane as shown in each example. In this case, the total gasoline available (direct and alkylate) in Example 1 is 85.5% with 96.4 octane number (Research and 3 cc. TEL), while in Example 2 it is 89.1% with 100.0 octane number (Research+3 cc. TEL).

The same comparison is equally true as between Examples 6 and 7. Substantial total gasoline yield advantages (+10) can be realized if all the $C_3$ and $C_4$ olefins are alkylated employing some outside isobutane. This is achieved with an octane advantage of +4.5 numbers.

EXAMPLES 8 AND 9

These examples will illustrate the catalytic cracking of a gas oil using a catalyst composition comprising a large pore size zeolite in combination with a 5 angstrom type zeolite. Such materials are described and claimed in copending application Ser. No. 548,376, filed May 9, 1966. These results are then compared in Table 1 with those obtained with the novel catalyst compositions of this invention (Examples 2 and 3) and with the blank catalyst of Example 1.

Example 1 is a blank using a catalyst composition comprising a Georgia clay and a rare earth Y without the addition of any other aluminosilicate. Examples 3 and 2 add ZSM-5 to the catalyst mixture. Examples 1, 2, 3 were described in detail earlier. Examples 8 and 9 add a 5 angstrom aluminosilicate identified as erionite to the REY-clay catalyst mixture.

Additional details concerning the results of the catalytic cracking of an Amal gas oil are shown in Table 1.

TABLE 1
Comparison of REY-ZSM-5 and REY-Erionite

| | REY-ZSM-5 clay matrix | | | REY-erionite clay matrix | |
|---|---|---|---|---|---|
| Example | 1 | 2 | 3 | 8 | 9 |
| Catalyst description: | | | | | |
| Matrix | Georgia kaolin clay | Georgia kaolin clay | Georgia kaolin clay | Georgia kaolin clay | Georgia kaolin clay |
| Gas: | | | | | |
| Type | REY | REY | REY | REY | REY |
| Conc., wt. percent | 10 | 10 | 10 | 10 | 10 |
| Type | | ZSM-5 | ZSM-5 | Erionite | Erionite |
| Conc., wt. percent | | 5 | 10 | 5 | 10 |
| Thermal treat | (1) | (1) | (1) | (1) | (1) |
| Catalytic evaluation (Amal gas oil): | | | | | |
| Conditions: | | | | | |
| LHSV | 4 | 4 | 4 | 4 | 4 |
| C/O | 1.5 | 1.5 | 1.5 | 1.5 | 1.5 |
| Temp., °F | 906 | 904 | 902 | 906 | 902 |
| Conversion, vol. percent | 75.2 | 72.8 | 69.7 | 67.6 | 64.5 |
| $C_5^+$ gasoline, vol. percent | 63.7 | 55.3 | 46.6 | 51.5 | 53.4 |
| Total $C_4$'s, vol. percent | 17.2 | 19.2 | 23.4 | 13.6 | 12.4 |
| Dry gas, wt. percent | 6.4 | 10.0 | 11.6 | 7.2 | 7.5 |
| Coke, wt. percent | 1.7 | 1.7 | 1.6 | 1.9 | 2.0 |
| $H_2$, wt. percent | 0.05 | 0.04 | 0.04 | 0.12 | 0.2 |

| | Wt. percent | Vol. percent | Wt. percent | Vol. percent | Wt. percent | Vol. percent | Wt. percent | Vol. percent | Wt. percent | Vol. percent |
|---|---|---|---|---|---|---|---|---|---|---|
| $C_1$ | 0.44 | | 0.39 | | 0.37 | | 0.40 | | 0.37 | |
| $C_2^=$ | 0.42 | | 0.48 | | 0.58 | | 0.60 | | 0.66 | |
| $C_2$ | 0.44 | | 0.42 | | 0.37 | | 0.42 | | 0.38 | |
| $C_3^=$ | 3.41 | | 6.64 | | 7.89 | | 3.97 | | 4.09 | |
| $C_3$ | 1.60 | | 2.01 | | 2.33 | | 1.73 | | 1.76 | |
| $C_4^=$ | 4.80 | 6.90 | 5.81 | 8.37 | 7.72 | 11.11 | 3.84 | 5.53 | 2.59 | 5.16 |
| $iC_4$ | 5.18 | 8.07 | 5.88 | 9.16 | 6.66 | 10.36 | 4.06 | 6.32 | 3.51 | 5.46 |
| $nC_4$ | 1.50 | 2.25 | 1.10 | 1.64 | 1.29 | 1.94 | 1.19 | 1.79 | 1.20 | 1.79 |
| $C_5^=$ | 4.28 | 5.74 | 3.67 | 4.92 | 4.63 | 6.21 | 2.62 | 3.57 | 2.56 | 3.42 |
| $iC_5$ | 5.01 | 7.03 | 4.19 | 5.88 | 5.23 | 7.34 | 4.82 | 6.76 | 4.12 | 5.78 |
| $nC_5$ | 0.53 | 0.73 | 0.22 | 0.31 | 0.54 | 0.75 | 0.52 | 0.72 | 0.46 | 0.64 |
| ON $C_5^+$R+3 | | 93.7 | | 97.2 | | 98.6 | | 94.5 | | 94.7 |

[1] 24 hours at 1,200° F. with steam at 15 p.s.i.g.

The results shown in Table 1 clearly indicate the superiority of a catalytic cracking process of this invention over the use of a large pore zeolite alone or in admixture with a zeolite having a pore size of about 5 angstrom units such as erionite. It can be seen the use of both a ZSM-5 type catalyst and a large pore zeolite resulted in increased octane number to a greater extent than that available by the use of a catalyst composite using erionite. Thus, although erionite does, indeed, result in an increased octane number product, it is not as superior as a catalyst composite comprising a zeolite of the ZSM-5 type in admixture with a large pore zeolite.

Another outstanding feature of great economic significance for using the catalyst composite of this invention is the unexpected high yield of $C_3$ and $C_4$ olefins. The catalyst containing erionite do not show high olefin yield as is obvious from the results set forth in Table 1. It should become fairly obvious that high yields of $C_3$ and $C_4$ olefins when alkylated contributed to additional increases in yields of high octane numbered gasoline.

In order to demonstrate this point, an overall comparison of the rare earth exchanged Y, the rare earth Y-ZSM-5, and the rare earth Y-erionite catalyst for ultimate yield of high octane product at a comparable conversion of 72.8 volume percent was calculated and is presented in Table 2.

As can be seen from the results of this table, the superiority of a catalyst composition comprising a large pore zeolite and a ZSM-5 type zeolite over use of a large pore size zeolite, alone or in admixture with a conventional zeolite of the 5 angstrom pore size variety is clearly demonstrated.

EXAMPLES 10 AND 11

These examples serve to illustrate that the previously discussed catalytic advantages of high gasoline yields, including alkylate from $C_3$ and $C_4$ olefin alkylation, of higher octane can be achieved with bead catalysts containing ZSM-5 type crystalline aluminosilicates in addition to the conventional rare earth fujasite.

Comparative catalysts were prepared to illustrate the particular catalytic feature of the invention.

EXAMPLE 10

This catalyst was prepared to contain 5% ZSM-5 and 7.5% REY (by weight) by mixing the following solutions (and slurries):

(A) Silicate solution (1)

|  | Lbs. |
|---|---|
| Q brand silicate [1] | 12.05 |
| $H_2O$ | 6.09 |

TABLE 2

| | Example 1 | Example 2 | Example 8 |
|---|---|---|---|
| | 10% REY | 10% REY+5% ZSM-5 | 10% REY+5% erionite |
| | CAT-C conversion of Amal gas oil at 4 LHSV, 1.5 C/O, 900° F., 10 min. | | |
| Conversion, vol. percent | 72.8 | 72.8 | 72.8 |
| $C_5^+$ gasoline, vol. percent | 61.7 | 55.3 | 55.3 |
| Total $C_4$'s, vol. percent | 16.7 | 19.2 | 14.6 |
| Dry gas, wt. percent | 6.2 | 10.0 | 7.8 |
| Coke, wt. percent | 1.7 | 1.7 | 2.2 |

| | Wt. percent | Vol. percent | Wt. percent | Vol. percent | Wt. percent | Vol. percent |
|---|---|---|---|---|---|---|
| $C_3^=$ | 3.30 | 5.45 | 6.64 | 11.0 | 4.27 | 7.05 |
| $C_4^=$ | 4.65 | 6.70 | 5.81 | 8.38 | 4.13 | 5.95 |
| $iC_4$'s | 5.02 | 7.81 | 5.88 | 9.15 | 4.37 | 6.8 |
| Alkylate yield: | | | | | | |
| $C_3^=$ | | 9.05 | | 18.3 | | 11.7 |
| $C_4^=$ | | 11.8 | | 14.8 | | 11.5 |
| Total | | 20.85 | | 33.1 | | 23.2 |
| Outside $iC_4$'S required | | 7.3 | | 6.9 | | 5.7 |
| Total yield $C_5^+$+alkylate, vol. percent | | 82.6 | | 88.4 | | 78.5 |
| ON R+3: | | | | | | |
| $C_5^+$ | | 93.7 | | 97.2 | | 94.5 |
| $C_5^+$+alkylate | | 96.3 | | 100 | | 97.2 |

(A) Silicate solution—Continued (2)

| | Lbs. |
|---|---|
| Coked plant calcined REY (2.8% Na) | 0.583 |
| Coked NH$_4$ form of ZSM-5 | 0.388 |
| A$_3$–Al$_2$O$_3$ (plus 9.8 g. GL70 dispersant) | 2.775 |
| H$_2$O | 6.07 |

[1] 28.9 wt. percent SiO$_2$, 8.9 wt. percent Na$_2$O, 62.2 wt. percent H$_2$O.

Solution (2) added to solution (1). Specific gravity 1.268 at 74° F.

(B) Acid Solution

| | Lbs. |
|---|---|
| H$_2$O | 57.1 |
| Al$_2$(SO$_4$)$_3$·18H$_2$O | 4.23 |
| H$_2$SO$_4$ | 1.98 |

Specific gravity 1.057 at 74° F.

These solutions were mixed together continuously in a mixing nozzle flowing the silicate solution at 68° F. at 400 cc. per minute and the 38° F. acid solution at 332 cc. per minute forming a hydrosol having a pH of 8.5 to 8.7 which gelled into bead hydrogel in three seconds at 63° F. The sol was formed into bead hydrogel in the conventional bead-forming apparatus.

The calculated product composition of the resulting bead hydrogel was:

Matrix

| | Wt. percent |
|---|---|
| SiO$_2$ | 94.6 |
| Al$_2$O$_3$ | 5.4 |

Product

| | |
|---|---|
| Si/Al matrix | 49.7 |
| REY | 7.6 |
| ZSM-5 | 5.0 |
| A$_3$Al$_2$O$_3$ | 37.7 |

The resulting bead hydrogel was processed by exchanging continuously over a 24-hour period with a 1.5 wt. percent Al$_2$(SO$_4$)$_3$·18H$_2$O solution, charging ½ volume of solution per volume of hydrogen per hour. Following the exchange, the bead hydrogel was washed free of sulfate ions, dried at 450° F., calcined 10 hours at 1000° F. and then steamed for 14 hours at 1290° F. with 100% steam at atmospheric pressure.

EXAMPLE 11

This example was prepared not as a catalyst representative of the present invention but as a comparison for Example 10 and containing only 7.5 wt. percent REY in the silica-alumina matrix. Preparation details for this example involve mixing the following solutions (and slurries).

(A) Silicate solution (1)

| | Lbs. |
|---|---|
| Q Brand [1] | 12.05 |
| H$_2$O$_2$ | 6.90 |

(2)

| | |
|---|---|
| REY (2.8% Na) (96% solids) [2] | 0.584 |
| A$_3$AlO$_3$+10.7 grams GL 70 dispersant | 3.15 |
| H$_2$O$_2$ | 6.07 |

[1] 28.9 wt. percent SiO$_2$, 8.9 wt. percent Na$_2$O, 62.2 wt. percent H$_2$O.
[2] REY milled 1 hour in 20 percent water slurry then passed through colloid mill for dispersion.

Solution (2) added to solution (1). Specific gravity 1.280 at 74° F.

(B) Acid solution

| | Lbs. |
|---|---|
| H$_2$O | 57.1 |
| Al$_2$(SO$_4$)$_3$·18H$_2$O | 4.23 |
| H$_2$SO$_4$ 97% | 1.98 |
| CrK (SO$_4$)$_3$·12H$_2$O | 0.567 |

Specific gravity 1.065 at 77° F.

These solutions were mixed together as described in Example 10 flowing the 65° silicate solution at 380 cc. per minute and the 42° F. acid solution at 320 cc. per minute forming a 8.2 to 8.6 pH hydrosol which formed into hydrogel in 3.3 seconds at 65° F.

The resulting bead hydrogel was processed by exchanging continuously with a 1.5 weight percent Al$_2$(SO$_4$)$_3$·18H$_2$O as was done in Example 10. The catalyst was further dried, calcined, and steamed for 14 hours at 1290° F. at atmospheric pressure.

Comparative catalytic data for these catalysts are given in the following Table 3. The catalyst of the invention (Example 10) again shows advantages in octane, unleaded and leaded, and yield of about 3 octane and over 3 volume percent total yield (C$_5$+ gasoline plus alkylate). In both examples outside iC$_4$'s are required to alkylate total olefins available.

TABLE 3

| | Example No. | |
|---|---|---|
| Description | 10 | 11 |
| | 7.5% REY + 5% ZSM-5 | 7.5% REY |
| Test conditions: | | |
| LHSV | 2.5 | 2.5 |
| C/O | 2.4 | 2.4 |
| Temperature, °F | 906 | 911 |
| Conversion, vol. percent | 64.2 | [1] 64.2 |
| C$_5$+ gasoline, vol. percent | 48.0 | 53.5 |
| Total C$_4$'s, vol. percent | 17.0 | 13.8 |
| Dry gas, wt. percent | 8.3 | 5.9 |
| Coke, wt. percent | 2.0 | 1.9 |
| H$_2$, wt. percent | 0.03 | 0.03 |

| | Wt. percent | Vol. percent | Wt. percent | Vol. percent |
|---|---|---|---|---|
| C$_1$ | 0.47 | | 0.46 | |
| C$_2$= | 0.54 | | 0.47 | |
| C$_2$ | 0.47 | | 0.45 | |
| C$_3$= | 5.0 | 8.4 | 3.0 | 5.0 |
| C$_3$ | 1.7 | 3.0 | 1.5 | 2.6 |
| C$_4$= | 4.7 | 6.8 | 3.3 | 4.8 |
| iC$_4$ | 5.4 | 8.5 | 4.7 | 7.3 |
| nC$_4$ | 1.1 | 1.6 | 1.2 | 1.8 |
| C$_5$= | 2.8 | 3.7 | 1.8 | 2.4 |
| iC$_5$ | 5.7 | 7.9 | 5.6 | 7.8 |
| nC$_5$ | 0.4 | 0.6 | 0.5 | 0.7 |
| ON C$_5$+ gasoline | | 90.7 | | 87.5 |
| ON (R + 3) C$_5$+ gasoline | | 97.6 | | 94.8 |
| Alkylate yield: | | | | |
| C$_3$= | | 13.9 | | 8.3 |
| C$_4$= | | 12.0 | | 8.5 |
| Total | | 25.9 | | 16.8 |
| Outside iC$_4$'s, vol. percent | | +9.6 | | +4.1 |
| Total yield alkylate + C$_5$+ gasoline vol. percent | | 73.9 | | 70.3 |
| ON (alkylate + C$_5$+): | | | | |
| (Clear) | | 92.7 | | 89.8 |
| (R + 3) | | 100.0 | | 97.0 |

[1] Calculated adjustment from 69.4% conv. to 64.2% for comparison at same conversion.

The following examples will serve to illustrate that catalytic advantage can also be appreciated using the combinations of REY and ZSM-5 in fluid catalysts.

EXAMPLE 12

This example was prepared to contain 10% REY and 10% HZSM-5 in a silica-clay (60% $SiO_2$–40% clay) matrix. Preparation details are as follows:

A clay silicate slurry was prepared dispersing 2.48 lbs. of kaolin clay (86% solids) into 55.2 lbs. water. To this was added 10.98 lbs. of N Brand silicate (28.9 wt. percent $SiO_2$, 8.9 wt. percent $Na_2O$, 62.2 wt. percent $H_2O$) over a 30-minute period while heating to 120° F. To this was then added 198 cc. of concentrated $H_2SO_4$ (97%) over a 30-minute period. The temperature was increased to 140° F. and held for 2 hours. Following this heat treatment additional $H_2SO_4$ was added over another 30-minute period to adjust the pH for about 10 to 4.5 pH requiring an additional 198 cc. of concentrated $H_2SO_4$. This mixture was allowed to stir overnight followed by final pH adjustment to 4.5 requiring 0.5 cc. $H_2SO_4$. In this slurry was dispersed a mixture of 359 g. coked plant calcined REY (3 wt. percent Na) (84% solids) and 305 g. (99% solids) HZSM-5 slurred in 906 g. water 90 g. $RECl_3 \cdot 6H_2O$. The resulting slurry was pumped through a homogenizer into a spray dryer and dried at an inlet temperature of 625–575° F. and an outlet temperature of about 290–300° F. Product yield was 2992 g. from the chamber and 638 g. from the dryer cyclone.

The resulting spray-dried product was processed by contacting a 13-inch bed of catalyst continuously at room temperature for five hours with a 5 wt. percent $$(NH_4)_2SO_4$$

solution charging 15 gallons of solution over the 13″ bed having a 4″ diameter. The exchanged product was washed free of sulfate ions, dried at 250° F., calcined 10 hours at 1000° F. prior to steaming for four hours at 1400° F. with 100% steam at atmospheric pressure ($SF_4$).

The final fluid catalyst product analyzed to have a residual sodium content of 0.08 wt. percent and $(RE_2)O_3$ content of 1.8 wt. percent.

EXAMPLE 13

This example is a commercial fluid silica-clay matrix catalyst containing 2% $ZrO_2$ and 10% calcined REY (3% Na). It is thus not a catalyst of the invention, but rather, a comparison catalyst.

Prior to evaluation this catalyst was also steamed as described under Example 12.

Both of these catalysts were evaluated with a WCMCGO (WCMCGO=Wide Cut Mid-Continent Gas Oil) at conditions to give 78.9 volume percent conversion. The data presented in the following Table 4 clearly show the total yield, including $C_3$–$C_4$ alkylate, and octane advantages employing the combined catalyst of REY and ZSM-5, illustrative of the present invention.

TABLE 4

| | Example No. 12 | Example No. 13 |
|---|---|---|
| Description | Silica-clay 60/40 10% REY and 10% ZSM-5 | Silica-clay $ZrO_2$ 58/40/2 10% REY |
| Test conditions: | | |
| WHSU | 4.99 | 7.12 |
| C/O | 5.01 | 7.02 |
| Temperature, °F | 927 | 927 |
| Time, minutes | 2.4 | 1.2 |
| Conversion, vol. percent | 78.9 | 78.9 |
| $C_5^+$ gasoline, vol. percent | 52.7 | 60.4 |
| Total $C_4$'s, vol. percent | 24.5 | 18.5 |
| Coke, wt. percent | 3.9 | 5.6 |
| $H_2$, wt. percent | 0.02 | 0.03 |

| | Wt. percent | Vol. percent | Wt. percent | Vol. percent |
|---|---|---|---|---|
| $C_1$ | 0.57 | | 0.49 | |
| $C_2^=$ | 0.78 | | 0.65 | |
| $C_2$ | 0.57 | | 0.55 | |
| $C_3^=$ | 6.60 | 11.09 | 3.54 | 5.95 |
| $C_3$ | 2.92 | 5.04 | 2.44 | 4.21 |
| $C_4^=$ | 5.40 | 7.78 | 3.55 | 5.11 |
| $iC_4$ | 9.32 | 14.51 | 6.84 | 10.65 |
| $nC_4$ | 1.46 | 2.19 | 1.81 | 2.73 |
| $C_5^=$ | 2.64 | 3.55 | 1.76 | 2.37 |
| $iC_5$ | 7.03 | 11.01 | 7.59 | 10.67 |
| $nC_5$ | 0.56 | 0.79 | 0.84 | 1.18 |
| ON (R + 3) | 99.3 | | 95.7 | |
| Alkylate yield: | | | | |
| $C_3^=$ | | 18.1 | | 9.9 |
| $C_4^=$ | | 13.7 | | 9.0 |
| Total | | 31.8 | | 18.9 |
| Outside $iC_4$'s, vol. percent | | 7.4 | | 2.4 |
| Total yield alkylate + $C_5^+$, vol. percent | | 84.5 | | 79.3 |
| ON (R + 3) | | 101.0 | | 97.8 |

What is claimed is:

1. In the catalytic cracking of hydrocarbons, the improvement of contacting said hydrocarbons under cracking conditions with a catalyst composition comprising a mixture of discrete crystallites of (a) a crystalline aluminosilicate having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and $z$ is between 0 and 40, said aluminosilicate having the X-ray diffraction lines as set forth in Table 1 of the specification; and (b) a crystalline aluminosilicate having a pore size greater than 7 angstrom units.

2. The process of claim 1 wherein at least one aluminosilicate has been base exchanged with hydrogen ions or ammonium ions.

3. The process of claim 1 wherein at least one aluminosilicate has been base exchanged with rare earth cations.

4. In the catalytic cracking of a hydrocarbon oil to produce hydrocarbons of lower boiling range, the improvement of contacting said oil under cracking conditions with a catalyst composition comprising discrete crystallites of (a) a crystalline aluminosilicate having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and $z$ is between 0 and 40, said aluminosilicate having the X-ray diffraction lines as set forth in Table 1 of the specification; and (b) an aluminosilicate having a pore size greater than 7 Angstrom units embodied within particles comprising a porous matrix.

5. The process of claim 4 wherein both types of aluminosilicate crystallites are within the same particle.

6. The process of claim 4 wherein each particle comprises only one type of aluminosilicate crystallites.

7. The process of claim 4 wherein the porous matrix comprises an inorganic oxide gel.

8. The process of claim 4 wherein the porous matrix is selected from silica, alumina, zirconia, clay, and combinations thereof.

9. The process of claim 4 wherein the porous matrix is extruded with α-alumina.

10. The process of claim 4 in which the aluminosilicate having a pore size greater than 7 angstrom units is synthetic faujasite.

11. The process of claim 4 in which the crystallites comprise:
   (a) cationic forms of the crystalline aluminosilicate having the X-ray diffraction lines as set forth in Table 1 of the specification chosen from the group consisting of hydrogen, polyvalent metals and mixtures thereof; and
   (b) synthetic rare earth faujasite.

12. The process of claim 4 in which the ratio of crystallites (a) to those of crystallite (b) is within the range of 1:10 to 3:1.

References Cited

UNITED STATES PATENTS

| | | | |
|---|---|---|---|
| 3,438,887 | 4/1969 | Morris et al. | 208—111 X |
| 3,494,854 | 2/1970 | Gallagher et al. | 208—111 X |
| 3,539,498 | 11/1970 | Morris et al. | 208—111 |
| 3,620,963 | 11/1971 | Mulaskey | 208—111 |
| 3,650,945 | 3/1972 | Bertolacini et al. | 208—111 |
| 3,354,096 | 11/1967 | Young | 208—111 X |
| 3,558,475 | 1/1971 | Jaffe | 208—111 |

DANIEL E. WYMAN, Primary Examiner
P. F. SHAVER, Assistant Examiner

U.S. Cl. X.R.

208—111; 252—455 Z

PO-1050
(5/69)

UNITED STATES PATENT OFFICE
CERTIFICATE OF CORRECTION

Patent No. 3,758,403        Dated September 11, 1973

Inventor(s) EDWARD J. ROSINSKI, CHARLES J. PLANK and ALBERT B. SCHWARTZ

It is certified that error appears in the above-identified patent and that said Letters Patent are hereby corrected as shown below:

Column 1, line 7, "Mobil Oil Company" should be --Mobil Oil Corporation--.

Column 4, line 8, "were" should be --where--.

Column 4, line 51, under heading "As made", "3.40" should be --3.48--.

Column 5, line 74, "action" should be --cation--.

Column 9, line 51, "the" should be --this--.

Column 14, line 2, "part sby" should be --parts by--.

Column 15, line 71, under Example 1, between headings "Wt. percent" and "Vol. percent", caption "Total", --20.85" should be --20.9--.

Signed and sealed this 5th day of March 1974.

(SEAL)
Attest:

EDWARD M. FLETCHER, JR.
Attesting Officer

C. MARSHALL DANN
Commissioner of Patents